United States Patent
Kohlenberg et al.

(10) Patent No.: US 6,425,469 B1
(45) Date of Patent: Jul. 30, 2002

(54) DEVICE FOR AIDING A MOVEMENT OF A CURRENT COLLECTOR TROLLEY IN AND OUT OF AN ELONGATE PLASTIC PROFILE OF A SLIDING CONTACT LINE

(75) Inventors: Thomas Kohlenberg, Soest; Uwe Schulte, Wetter, both of (DE)

(73) Assignee: Atecs Mannesmann AG, Düsseldorf (DE)

( * ) Notice: Subject to any disclaimer, the term of this patent is extended or adjusted under 35 U.S.C. 154(b) by 0 days.

(21) Appl. No.: 09/671,473

(22) Filed: Sep. 27, 2000

(30) Foreign Application Priority Data

Sep. 27, 1999 (DE) .......................... 199 48 108

(51) Int. Cl.⁷ .............................. B60L 5/04; E01B 25/27
(52) U.S. Cl. .......................... 191/50; 104/108
(58) Field of Search .................. 191/50, 23 A; 104/106, 108, 109, 111, 118, 140

(56) References Cited

U.S. PATENT DOCUMENTS 4,416,357 A * 11/1983 Szysh ....................... 191/23 A

FOREIGN PATENT DOCUMENTS

EP 0 938 168 A 8/1999
FR 2 329 091 A 5/1977

OTHER PUBLICATIONS

Brochure: "Sicherheits–Schleifleitungen in Kunststoff" [safety sliding contact lines of plastic], released by Paul Vahle GmbH & Co. KG (Catalog No.: 4a/D91, 1991, pp. 12–17).
Brochure: "Sicherheits–Schleifleitungen in Kunststoff" [safety sliding contact lines of plastic], released by Paul Vahle GmbH & Co. KG (Catalog No.: 4c/D96, 1996, p. 11).

* cited by examiner

*Primary Examiner*—S. Joseph Morano
*Assistant Examiner*—Robert J. McCarry, Jr.
(74) *Attorney, Agent, or Firm*—Henry M. Feiereisen

(57) ABSTRACT

A device for aiding a movement a current collector trolley in and out of an elongate plastic profile of a sliding contact line accommodating current conductor rails, includes a funnel, and a sleeve embracing the elongate plastic profile in a form-fitting manner and intended to secure a rear end of the funnel to one end of the sliding contact line. The sleeve is freely movable along the elongate plastic profile before securement of the funnel and laps over the end of the elongate plastic profile when the funnel is secured in place, whereby the rear end of the funnel has a contour complementing an inner contour of the elongate plastic profile and received in form-fitting engagement in the elongate plastic profile.

8 Claims, 4 Drawing Sheets

DEVICE FOR AIDING A MOVEMENT OF A CURRENT COLLECTOR TROLLEY IN AND OUT OF AN ELONGATE PLASTIC PROFILE OF A SLIDING CONTACT LINE

CROSS-REFERENCES TO RELATED APPLICATIONS

This application claims the priority of German Patent Application Serial No. 199 48 108.3, filed Sep. 27, 1999, the subject matter of which is incorporated herein by reference.

BACKGROUND OF THE INVENTION

The present invention relates to a device for aiding a movement of a current collector trolley in and out of an elongate plastic profile of a sliding contact line.

According to company brochures, entitled "Sicherheits-Schleifleitungen in Kunststoff" [safety sliding contact lines of plastic] and released by Paul Vahle GmbH & Co.KG (catalog nos: 4c/D96 and 4a/D91), current collector trolleys are described which are intended to move in and out of an elongate plastic profile of a sliding contact line which accommodates longitudinally therein current conductor rails. Funnels are used as guidance during in-and-out travel of the trolleys. Typically, the funnel is held in alignment with the plastic profile by a sleeve such that the rear end of the funnel is positioned in end-to-end relationship with the confronting end of the plastic profile whereby the sleeve laps over the end of the plastic profile.

The attachment of the funnel to the plastic profile in this conventional manner is disadvantageous because a protection against accidental contacting cannot be ensured, or can only be ensured in a complicated manner. In particular, the provision of a sufficient protection against accidental contacting rules out a compact design of the funnel. Moreover, there is no assurance that the creeping distance has a sufficient minimum length to comply with safety regulations, without complex mechanical finishing works. Another drawback of this conventional device is the complexity of assembling many single components.

SUMMARY OF THE INVENTION

It is thus an object of the present invention to provide an improved device for aiding a movement of a current collector trolley in and out of an elongate plastic profile of a sliding contact line, obviating the afore-stated drawbacks.

This object, and others which will become apparent hereinafter, are attained in accordance with the present invention by providing a funnel, and a sleeve embracing in a form-fitting manner the elongate plastic profile of the sliding contact line and intended to secure a rear end of the funnel to one end of the plastic profile, whereby the sleeve is freely movable along the plastic profile before securement of the funnel and laps over the end of the plastic profile when the funnel is secured in place, wherein the rear end of the funnel has a contour complementing an inner contour of the plastic profile and is received in form-fitting engagement in the elongate plastic profile.

In accordance with the present invention, the funnel projects into the elongate plastic profile such that the sleeve embraces the elongate plastic profile and the funnel in a form-fitting manner. As a consequence, the device is compact in structure and ensures sufficiently long creep distance while also realizing a sufficient protection against accidental contact. Through provision of the sleeve, an interlocking assembly of the funnel, the sleeve and the elongate plastic profile is obtained in a simple manner, i.e. plastic parts overlap one another. As a consequence, a short overall length of the device is realized so that tools for injection-molding these plastic components can have a simplified design. Moreover, there is no need to re-finish the end of the elongate plastic profile.

Suitably, the rear end of the funnel is at least partially tapered so that the funnel is easier to insert into the confronting end of the elongate plastic profile.

According to another feature of the present invention, the funnel snaps in the sleeve to realize a rapid and secure locked connection between the funnel and the sleeve. Suitably, the sleeve is secured to the elongate plastic profile by screw fasteners.

In order to maintain a short funnel design while still designing the funnel long enough for insertion in the elongate plastic profile, the funnel is provided with electrically insulating spacer elements extending rearwardly out from the funnel into the elongate plastic profile and connectable to the conductor rails in one-to-one correspondence. Suitably, spacer elements can be interconnected in a form-fitting manner to modify the overall length of insertion by which the funnel projects into the elongate plastic profile. In this way, a single spacer element length ensures different depths of insertion of the funnel in the elongate plastic profile. A simple construction is realized when the spacer elements are connectable in form-fitting manner with the rear end of the funnel.

Installation can be further simplified by inserting the spacer elements in the elongate plastic profile in anchoring grooves that are also provided for receiving the conductor rails. In this manner, the conductor rails projecting out from the elongate plastic profile can be connected with the spacer elements before installation, and the spacer elements can then be connected to the funnel. After this pre-assembly, the spacer elements together with the conductor rails and the funnel can be pushed into the elongate plastic profile.

According to another feature of the present invention, the spacer elements have one inwardly directed side which is formed with at least one vertical groove that extends transversely to the longitudinal axis. Thus, abrasion marks by the carbon brushes of the current collector trolley can be avoided. The groove thus prevents in a simple manner the formation of a continuous abrasion mark so that the insulating properties of the spacer elements are maintained even after an extended operation of the sliding contact line.

Through the provision of a device according to the present invention, it is assured in a simple manner that the neutral conductor is always contacted first, even at an asymmetrical operation of the device. It also permits an easy solution to fabricate funnels as mirror images from one another, i.e. a right and left configuration for attachment of funnels on opposite ends (entry funnel or exit funnel).

BRIEF DESCRIPTION OF THE DRAWING

The above and other objects, features and advantages of the present invention will be more readily apparent upon reading the following description of a preferred exemplified embodiment of the invention with reference to the accompanying draw which.

DETAILED DESCRIPTION OF PREFERRED EMBODIMENTS

Figure 1:
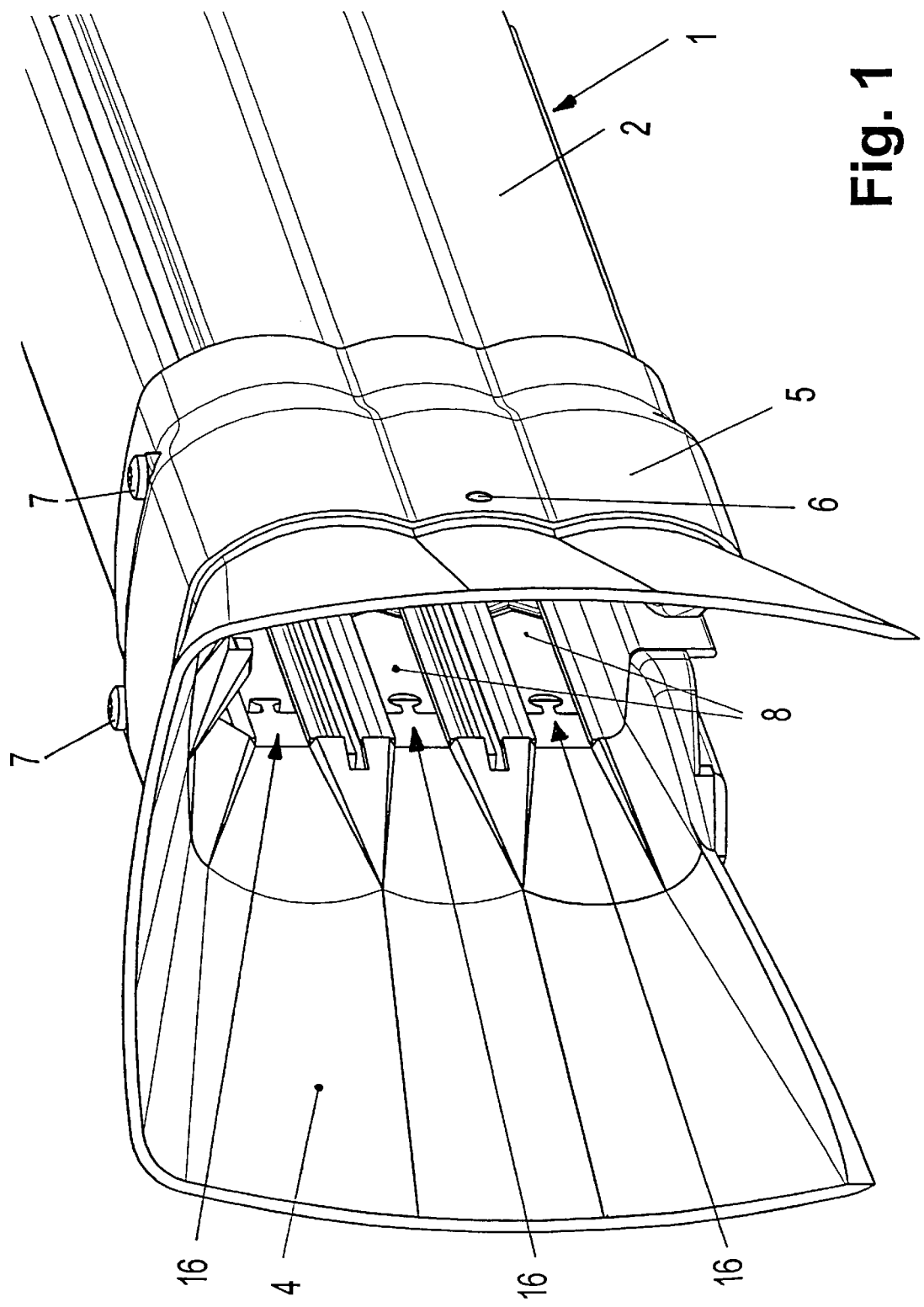
FIG. 1 is a front, top and side perspective illustration of one embodiment of a device according to the present invention for aiding an in-and-out movement of a current collector trolley with respect to an elongate plastic profile of a sliding contact line, in assembled state with attached funnel and sleeve.

Throughout all the Figures, same or corresponding elements are generally indicated by same reference numerals.

Turning now to the drawing, and in particular to FIG. 1, there is shown a front, top and side perspective illustration of one embodiment of a device according to the present invention for aiding an in-and-out movement of a current collector trolley (not shown) with respect to a sliding contact line, generally designated by reference numeral 1. The sliding contact line 1 includes an elongate plastic profile 2 to form a casing. Formed interiorly of the elongate plastic profile 2 are anchoring grooves 16 (FIG. 2) which extend in longitudinal direction and accommodate current conductor rails 3 for cooperation with the trolley traveling during operation longitudinally inside the sliding contact line 1. Disposed at one end of the sliding contact line 1 is a funnel, generally designated by reference numeral 4 and secured to the elongate plastic profile 2 by a sleeve, generally designated by reference numeral 5.

It will be appreciated by persons skilled in the art that the sliding contact line 1 contains additional parts which do not appear in the foregoing Figures, e.g. power supply cable and connection between the conductor rails to the cable. However, these parts, like much other necessary components, are not part of the invention, and have been omitted from the Figures for the sake of simplicity.

Figure 2:
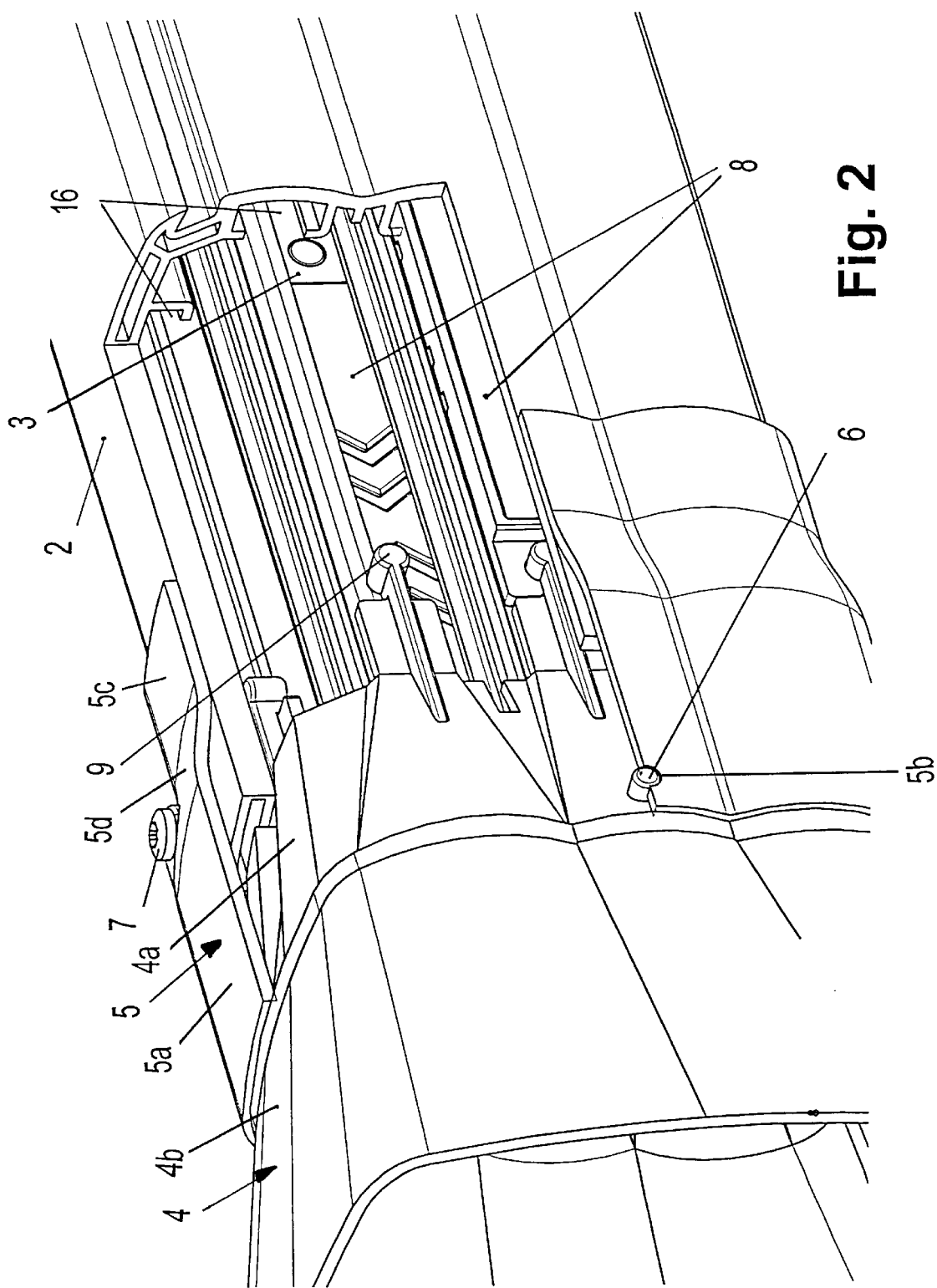
FIG. 2 is a perspective view of the device of FIG. 1, with the sleeve partially broken away to depict internal components.

As shown in particular in FIG. 2, the funnel 4 has a rearward portion 4a which projects into the elongate plastic profile 2 and has a configuration which complements an inner contour of the elongate plastic profile 2 so as to realize a positive or form-fitting engagement in the elongate plastic profile 2. The rearward funnel portion 4a is partially tapered to facilitate the insertion of the rearward funnel portion 4a into the elongate plastic profile 2. Extending the rearward funnel portion 4a forwards is a funnel-shaped portion 4b.

The funnel 4 is releasably coupled in an interlocking manner by means of a snap-fit 6 to a forward portion 5a of the sleeve 5. The snap-fit 6 is realized by a pin 6 which extends out from the funnel portion 4a for seating in a bore 5b in the forward sleeve portion 5a. Extending rearwardly from the forward sleeve portion 5a is a tapered transition zone 5c which terminates in a rearward sleeve portion 5c of smaller diameter than the diameter of the forward sleeve portion 5a. Two screw fasteners 7 are arranged in the transition zone 5c to secure the sleeve 5 to the elongate plastic profile 2 and thereby fix the funnel 4 in place on the elongate plastic profile 2. Additional fastening elements are not needed.

The sleeve 5 embraces the elongate plastic profile 2 with its rearward sleeve portion 5c in a form-fitting manner but is freely movable along the outside of the elongate plastic profile 2 before the screw fasteners 7 are tightened and the funnel 4 is secured to the elongate plastic profile 2.

Figure 3:
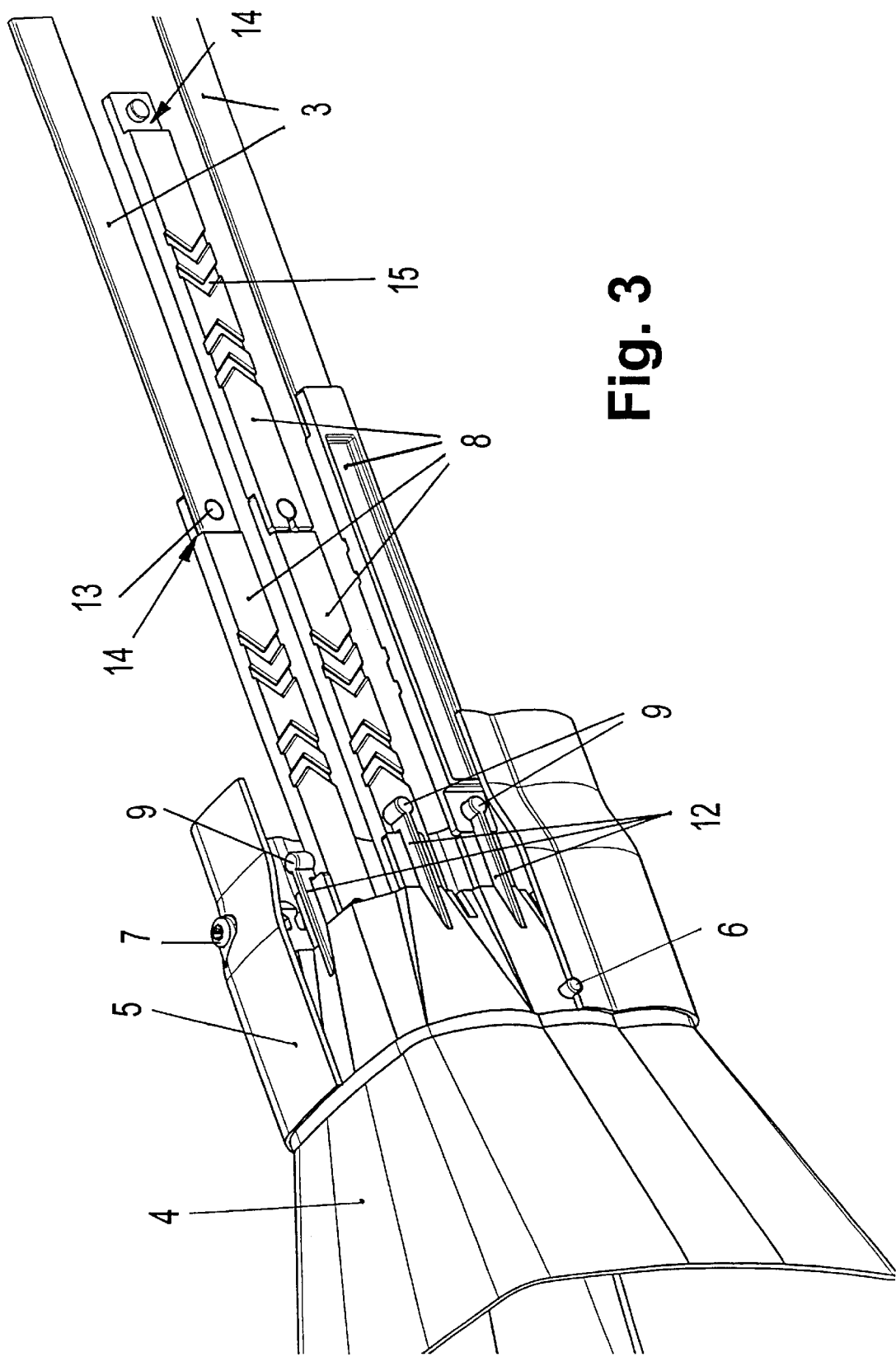
FIG. 3 is a front, top and side perspective view of the device of FIG. 1, with the elongate plastic profile being removed and the sleeve partially broken away to show spacer elements arranged at the funnel.

Turning now to FIG. 3, there is shown a front, top and side perspective view of the device of FIG. 1, with the elongate plastic profile 2 being removed and the sleeve 5 partially broken away, and it can be seen that the rear funnel portion 4b is connected to spacer elements 8. The rear funnel portion 4b is hereby provided with a plurality of axial fins 12 (see also FIG. 4 from a different angle) which extend rearwardly from the rear funnel portion 4b about the circumference thereof. At their funnel-distal end, the fins 12 carry a cylindrical pin 9 for engagement in a complementary throughbore 10 at the confronting end of the respective spacer element 8. In this way, an interlocking engagement between the funnel 4 and the spacer elements 8 is established. Suitably, the spacer elements 8 are formed with an elongate slot 11 for receiving the fin 12 and thereby allowing the interlocking engagement. The provision of the fins 12 ensures that the interlocking engagement is at all times constrained from rotating.

Figure 4:
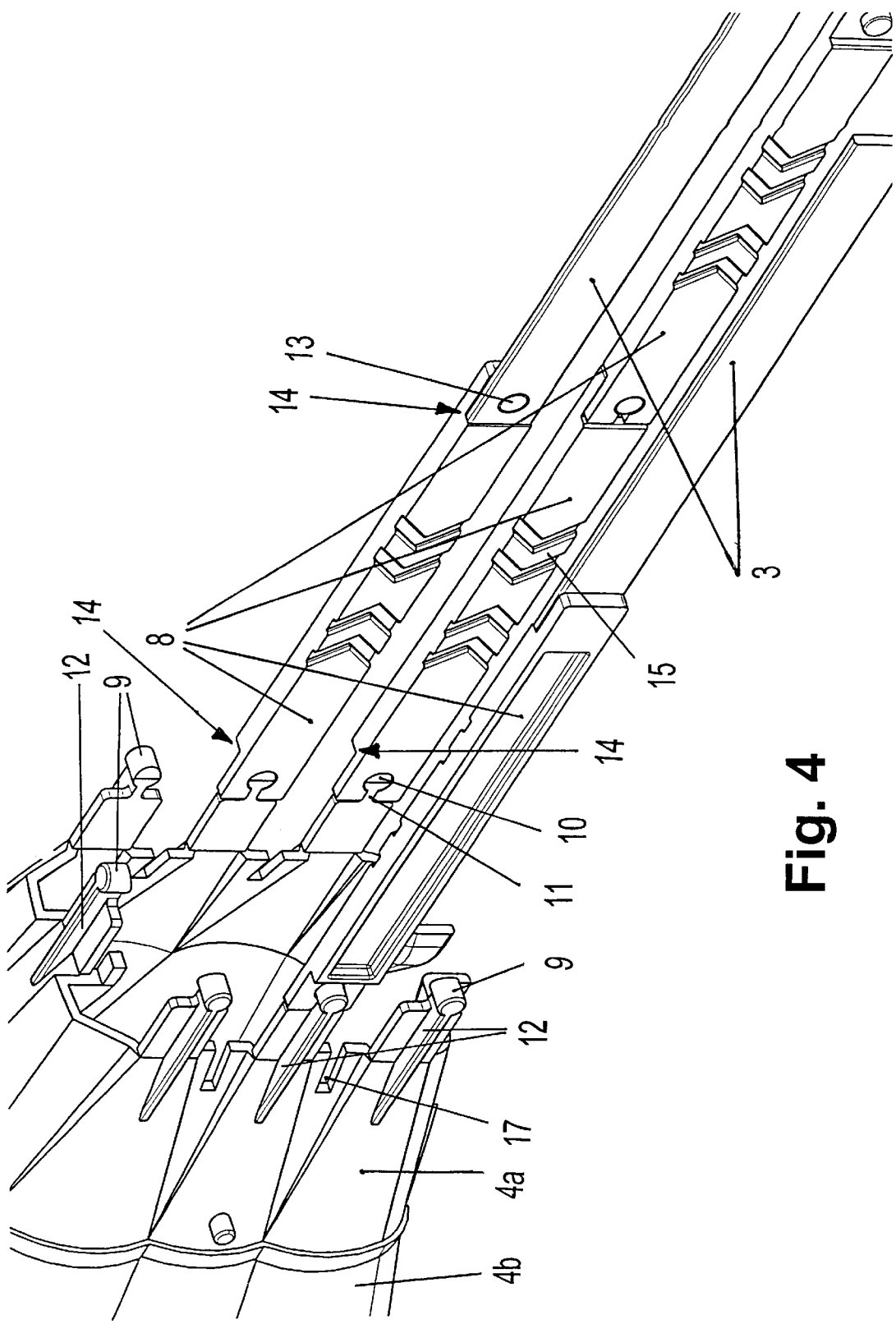
FIG. 4 is a side perspective view of the device of FIG. 1 from a different angle as in FIG. 3, with the sleeve being removed to show the rear end of the funnel and attached spacer elements.

FIGS. 3 and 4 show the arrangement of three spacer elements 8 secured on one end to the funnel 4. The other end of each spacer element 8 may be connected in from-fitting manner to a further spacer element 8 or to a conductor rail 3, and includes a cantilevered cylindrical pin 13 for interlocking engagement in a complementary bore at the confronting end of the spacer element 8 or conductor rail 3 to be attached. As shown in particular in FIG. 4, the spacer elements 8 are suitably formed with a shoulder 14 by which a misalignment of the spacer element 8 relative to the attached component, i.e. further spacer element 8 or conductor rail 3, is prevented, when the components are connected together.

The spacer elements 8 are further provided on their side facing inwardly into elongate plastic profile 2 with at least one groove 15 to prevent a continuous abrasion mark on the spacer elements 8 as a result of the carbon brushes of the trolley when sliding along the spacer elements 8.

Assembly of the device is effected by sufficiently pulling the conductor rails 3 from the elongate plastic profile 2. Subsequently, one end of the spacer elements 8 is attached to the conductor rails 3 and the other end of the spacer elements 8 is attached to the rear funnel portion 4a of the funnel 4. This pre-assembled construction is shown in FIG. 4 and can be pushed into the elongate plastic profile 2 until the rear funnel portion 4a is securely fitted in the elongate plastic profile 2. An accurate guidance of the pre-assembled construction is implemented by the anchoring grooves 16, which direct the conductor rails 3 as well as the spacer elements 8 during insertion of the construction. After seating the construction in the elongate plastic profile 2, the sleeve 5 is positioned in form-fitting engagement with the elongate plastic profile 2 and the rearward funnel portion 4a and secured in place by the screw fasteners 7 to the elongate plastic profile 2.

Of course, the conductor rails 3 may also be secured directly to the funnel 4, without interposition of spacer elements 8.

FIG. 4 further shows that the rearward funnel portion 4a is formed with axial slots 17 extending from the end face to enlarge the creep distance.

While the invention has been illustrated and described as embodied in a device for aiding a movement of a current collector trolley in and out of an elongate plastic profile of a sliding contact line, it is not intended to be limited to the details shown since various modifications and structural changes may be made without departing in any way from the spirit of the present invention.

What is claimed as new and desired to be protected by letters patent is set forth in the appended claims:

What is claimed is:

1. A device for aiding a movement of a current collector trolley in and out of an elongate plastic profile of a sliding contact line accommodating current conductor rails, said device comprising:

a funnel;

a sleeve embracing the elongate plastic profile in a form-fitting manner and intended to secure a rear end of the funnel to one end of the sliding contact line, said sleeve being freely movable along the elongate plastic profile before securement of the funnel and lapping over the end of the elongate plastic profile when the funnel is secured in place, wherein the rear end of the funnel has a contour complementing an inner contour of the elongate plastic profile and received in form-fitting engagement in the elongate plastic profile; and electrically insulating spacer elements connectable to the conductor rails in one-to-one correspondence and extending rearwardly from the rear end of the funnel for projection into the elongate plastic profile.

2. The device of claim 1 wherein the rear end of the funnel is at least partially tapered.

3. The device of claim 1 wherein the funnel and the sleeve have complementary means for realizing a snap-fit of the funnel to the sleeve.

4. The device of claim 1, and further comprising screw fasteners for securing the sleeve to the elongate plastic profile.

5. The device of claim 1 wherein each two of said spacer elements are connectable together.

6. The device of claim 1 wherein the spacer elements are connectable through interlocking engagement with the rear end of the funnel.

7. The device of claim 1 wherein the spacer elements are insertable in anchoring grooves formed in the elongate plastic profile and provided for receiving the conductor rails.

8. The device of claim 1 wherein each said spacer element defines a longitudinal axis and has an inwardly directed side formed with at least one groove which extends transversely to the longitudinal axis.

* * * * *